United States Patent
Rego et al.

(10) Patent No.: US 10,345,618 B1
(45) Date of Patent: Jul. 9, 2019

(54) METHOD FOR DETERMINING A SURFACE OF AN OPTICAL LENS ADAPTED TO A SPECTACLE FRAME

(71) Applicant: Essilor International, Charenton le Pont (FR)

(72) Inventors: Carlos Rego, Charenton le Pont (FR); Jérôme Moine, Charenton le Pont (FR); Mélanie Tessieres, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 736 days.

(21) Appl. No.: 14/898,430

(22) PCT Filed: Jun. 13, 2014

(86) PCT No.: PCT/EP2014/062379
§ 371 (c)(1),
(2) Date: Dec. 14, 2015

(87) PCT Pub. No.: WO2014/198894
PCT Pub. Date: Dec. 18, 2014

(30) Foreign Application Priority Data

Jun. 13, 2013 (EP) .................................... 13305799

(51) Int. Cl.
*G02C 7/02* (2006.01)
*G02C 13/00* (2006.01)
*G02C 7/06* (2006.01)

(52) U.S. Cl.
CPC ............. *G02C 7/028* (2013.01); *G02C 7/024* (2013.01); *G02C 7/061* (2013.01); *G02C 13/005* (2013.01)

(58) Field of Classification Search
CPC ...... G02C 7/024; G02C 7/027; G02C 13/005; B24B 9/144
USPC .......................... 351/159.74, 159.75, 159.76
See application file for complete search history.

(56) References Cited

U.S. PATENT DOCUMENTS

| 5,959,199 | A | * | 9/1999 | Suzuki | B24B 9/144 33/507 |
|---|---|---|---|---|---|
| 2010/0283965 | A1 | * | 11/2010 | Dubois | G02C 13/003 351/159.76 |
| 2010/0290003 | A1 | * | 11/2010 | Dubois | G06F 17/5004 351/159.76 |
| 2013/0135579 | A1 | * | 5/2013 | Krug | G02C 7/027 35/159.45 |
| 2013/0235336 | A1 | * | 9/2013 | Kozu | G02C 7/027 351/159.45 |

FOREIGN PATENT DOCUMENTS

| EP | 1 241 511 | 9/2002 |
|---|---|---|
| EP | 2 026 529 A1 | 2/2009 |
| EP | 2 028 533 | 2/2009 |
| EP | 2 305 423 | 4/2011 |
| EP | 2 428 835 | 3/2012 |

OTHER PUBLICATIONS

Office Action dated Jan. 25, 2017 in European Patent Application No. 14 729 681.8 citing document AO therein, 6 pages.

* cited by examiner

*Primary Examiner* — Darryl J Collins
(74) *Attorney, Agent, or Firm* — Oblon, McClelland, Maier & Neustadt, L.L.P.

(57) ABSTRACT

Method for determining a surface of a face of an optical lens to be mounted to a spectacle frame, the method comprising: a contour data providing step (S1), during which contour data representing a contour of the spectacle frame is provided, a target curvature data providing step (S2) during which target curvature data representing the target curvature of the surface to be determined over an evaluation zone of said surface is provided, an optical surface determining step (S3), during which a surface is determined so as to minimize: the difference between the target curvature and average curvature of the surface over the evaluation zone, and the difference between the contour of the spectacle frame and the periphery contour of the surface, the periphery contour of the surface corresponding to the contour of the surface to be determined of the optical lens after the optical lens has been edged to be mounted in the spectacle frame.

17 Claims, 3 Drawing Sheets

METHOD FOR DETERMINING A SURFACE OF AN OPTICAL LENS ADAPTED TO A SPECTACLE FRAME

RELATED APPLICATIONS

This is a U.S. national stage application under 35 USC § 371 of International application No. PCT/EP2014/062379 filed on Jun. 13, 2014. This application claims the priority of European application no. 13305799.2 filed Jun. 13, 2013, the entire content of which is hereby incorporated by reference.

FIELD OF THE INVENTION

The invention relates to a method, for example implemented by computer means, for determining a surface of a face of an optical lens to be mounted to a spectacle frame, a computer program product and a computer readable medium.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Usually, a person needing to wear spectacles and having thus a prescription filled by an ophthalmologist or an optometrist goes to the premise of an optician for choosing the spectacle frame of the future spectacles. The future wearer of the spectacles may try several spectacle frames and finally chooses one of the tried frames. The optician orders a pair of lenses corresponding to the prescription. The lenses sent to the optician are designed and manufactured according to optical criteria.

Depending on the service provided by the lens manufacturer, the optician may have to cut the lenses to fit the spectacle frame the person has chosen or in case of "remote edging" service the optician receives the lenses already cut and only has to fit them in the spectacle frame.

The inner circumference of the openings of the chosen spectacle frame (e.g. the openings of the frame where ophthalmic lenses are intended to be mounted) can be measured by a measuring device, for example a mechanical sensor. More particularly, the openings of the frame include the inner groove and the characteristics of the groove (tilt angle with the openings, depth of the groove, etc.) can be measured by the mechanical sensor in a measuring room.

The measurements performed by the mechanical sensor on the chosen spectacle frame make it possible to order ophthalmic lenses which fit the chosen spectacle frame, on the one hand, and the wearer prescription, on the other hand.

According to the measurements performed by the mechanical sensor in the measuring room, the optician or the provider of ophthalmic lenses are able to determine the edge and bevel the lenses to fit with the measurements performed on the chosen spectacle frame.

In the sense of the invention a step of cutting the lenses according to a spectacle frame shape is called "edging" and a step of forming a bevel on an external edged of the lens is called "beveling".

The lenses provider has to ensure that the provided lenses are adapted to the wearer prescription and to the chosen spectacle frame.

For example, the lenses provider has to ensure that the future lenses can effectively fit the chosen frame which may have particular openings and groove.

Usually, the optical surfaces of the optical lenses are based on optical criteria, such as the wearer prescription, optical comfort and the measured parameter of the spectacle frame are used for the edging and beveling steps.

In some cases, the edging and beveling step can be proceeded according not only to the measured shape of the spectacle frame but also according to esthetic criteria chosen by the wearer. For example, the esthetic criteria may implies having front face edges of the ophthalmic lens substantially abutting with front faces of the chosen spectacle frame when the ophthalmic lenses are fitted in the frame. Another example is that in some cases, the wearer would like to have lenses with a more flat curvature than the curvature of the frame, so as to have a thinner global appearance of the eyeglasses, or on the contrary would like to have a stronger curvature than the curvature of the frame so as to have a more curved global appearance of the eyeglass.

According to the esthetic criteria of the wearer and his prescription it is not always possible to meet both optical and esthetic criteria.

Usually the lens manufacturer will select a determined front surface by selecting a semi finished lens according to optical criteria, and then the lens manufacturer will machine the final optical lens. The shape of the ophthalmic lens is then defined.

The person executing the edging and beveling steps, for example the optician, receives the ophthalmic lens and has to proceed to the edging and beveling steps according to the shape of the spectacle frame and to the esthetic criteria of the wearer.

Depending on the shape of the ophthalmic lens, it is not always possible to edge and bevel the ophthalmic lens according to the wearer criteria because of an improper lens shape (external shape of the lens, shapes of the front and rear surfaces of the lens, lens thickness, etc.).

For example, the bevel curve of the spectacle lens may be less steep compared with the curve of the frame, depending on the bevel position, and in this case the frame is deformed so as to be matched with the bevel curve.

Besides the fact that it is time-consuming, deforming the spectacle frame so to have the optical lens fit said spectacle frame, has several drawbacks.

First such deformation may modify the size of the frame beyond the values calculated when the bevel position was selected, and thus result in a deficiency of the outer diameter.

Additionally, such deformation may introduce additional mechanical stress on the optical lenses, which significantly increases the risk of fracturing the mineral coatings that may be present on the lenses.

Furthermore, such deformation may introduce mechanical stresses in the elements of the frame, particularly the mobile parts, such as the joint, Such deformation of the spectacle frame may affect its appearance (destruction of symmetry change of the original curves of the model), more rudimentary means employed (pliers, heaters) can alter the aesthetics of the product (scratches, discoloration).

Such limitations are at least partly due to the fact that when determining the optical surfaces of the optical lens the shape, in particular the contour, of the spectacle frame is not considered.

SUMMARY OF THE INVENTION

Therefore, there is a need for a method for determining at least one surface of the optical lens so that such optical lens fits properly the selected spectacle frame.

A goal of the present invention is to provide such a method.

To this end, one aspect of the invention is directed to a method, for example implemented by computer means, for determining a surface of a face of an optical lens to be mounted to a spectacle frame, the method comprising:
- a contour data providing step, during which contour data representing a contour of the spectacle frame is provided,
- a target curvature data providing step, during which target curvature data representing the target curvature of the surface to be determined over an evaluation zone of said surface is provided,
- an optical surface determining step, during which a surface is determined so as to minimize:
  - the difference between the target curvature and average curvature of the surface over the evaluation zone, and
  - the difference between the contour of the spectacle frame and the periphery contour of the surface, the periphery contour of the surface corresponding to the contour of the surface to be determined of the optical lens after the optical lens has been edged to be mounted in the spectacle frame.

The method according to an embodiment of the invention determines the surface of the optical lens by considering both the contour of the spectacle frame and a curvature of at least an evaluation zone of the surface of the optical lens.

Advantageously, an optical lens having such a surface fits perfectly in the spectacle frame.

According to further embodiments which can be considered alone or in any possible combination:
- the contour data comprises at least the mean curvature of the contour and/or the 3D coordinates of points of the contour; and/or
- the target curvature data comprises at least a curvature value and/or a shift of curvature and/or a base value and/or a set of points defined by their 3D coordinates; and/or a set of different curvatures for different directions; and/or
- the target curvature is different from the average curvature of the spectacle frame; and/or
- the target base value $Bi$ representative of the target curvature $Ci$ in diopters fulfills:

$$Bm-3 \leq Bi \leq Bm+3,$$

with $Bm$ the average base value in diopters of the spectacle frame, and $$Bm=(n-1)*CURVm$$

with $CURVm$ the average curvature of the spectacle frame, and $n$ the index of the constituent material of the lens; and/or
- the target base value $Bi$ representative of the target curvature $Ci$ in diopters fulfills:

$$Bm-\text{D}Binf \leq Bi \leq Bm+\text{D}Bsup,$$

with $\text{D}Binf$ and $\text{D}Bsup$ depending on optical and/or technical requirements of the optical lens to be determined, and $$Bm=(n-1)*CURVm$$

with $CURVm$ the average curvature of the spectacle frame, and $n$ the index of the constituent material of the lens; and/or
- the evaluation zone is selected in the list consisting of: near vision zone, far vision zone, the intermediate corridor between the near and far vision zone, a peripheral rim, a nasal zone, a temporal zone, and a zone centered on the boxing center; and/or
- the face is the front face of the optical lens; and/or
- the optical lens is an ophthalmic lens adapted for a wearer and during the optical surface determined step the surface is determined based on the wearer's prescription; and/or
- during the optical surface determining step the surface is determined based on the difference of curvature of the contour of the spectacle frame and the periphery contour of the surface; and/or
- during the optical surface determining step the surface is determined so as to minimize the deviation between the periphery contour of the surface to be determined and the contour of the spectacle frame; and/or
- the deviation between the surface to be determined and the contour of the spectacle frame defined by the contour data is less or equal to 0.4 mm and, preferably, less or equal to 0.2 mm; and/or
- the optical surface determining step comprises a semi-finished optical lens selecting step during which a set of semi-finished optical lenses having the closest average curvature around their periphery to the average curvature of the contour of the spectacle frame and having a different average curvature at their periphery and over an evaluation zone is selected, and among this set of semi-finished optical lenses, the semi-finished lens having the closest average curvature in the evaluation zone to the target curvature in the evaluation zone is selected, the target curvature in the evaluation zone may be a curvature value or a difference value, and may be set according to preference of the wearer among and available range of curvature values; and/or
- the method further comprises:
  - a first surface cost function providing step, during which a first surface cost function is provided, the first surface cost function being a function of the deviation between the surface to be determined and the contour of the spectacle frame defined by the contour data,
  - a second cost function providing step, during which a second surface cost function is provided, the second surface cost function being a function of the difference over the evaluation zone between the curvature of the surface to be determined and the target curvature, during the optical surface determining step, the surface that minimizes a global surface cost function is determined, the global surface cost function being a weighted sum of at least the first and second surface cost functions; and/or
- the method further comprises:
  - a third surface cost function providing step, during which a third surface cost function is provided, the third surface cost function being a function of the ith derivative of the surface to be determined with i an integer greater than or equal to 2 and smaller than or equal to 4, and the global surface cost function is a weighted sum of at least the first, second and third surface cost functions; and/or
- the method further comprises:
  - an initial surface providing step, during which an initial surface is provided,
  - a working surface defining step, during which a working surface is defined to be equal to at least a portion of the initial surface, a set of surface cost functions providing step, during which a set of surface cost functions is provided, each surface cost function of the set of surface cost functions being a function of at least one criterion over an evaluation zone of the surface to be determined and the set of surface cost functions comprising at least one cost function, a global surface cost function evaluation step, during which a global surface cost function is evaluated, the global cost function being a weighted sum of at least each of the cost functions, a modifying step, during which the working surface is modified, and wherein the surface is determined by repeating the evaluation and modifying steps so as to minimize the global surface cost function; and/or the contour data provided during the contour data providing step is obtained by a method implemented by computer means for a measured contour of the spectacle frame, the method comprising:

a contour data providing step, during which a contour data representing measured points of a contour of the spectacle frame is provided, a working contour defining step, during which a working contour of the spectacle frame is defined, a first contour cost function providing step, during which a first contour cost function is provided, the first contour cost function being a function of the mth derivative of the curve of at least a portion of the working contour with m an integer greater than or equal to 2, a set of contour cost functions providing step, during which a set of contour cost functions is provided, each contour cost function of the set of contour cost functions being a function of at least the deviation between the working contour and the measured points of the contour and the set of contour cost functions comprising at least one contour cost function, a global contour cost function evaluation step during which a global contour cost function is evaluated, the global contour cost function being a weighted sum of the first contour cost function and of each contour cost function of the set of contour cost functions, a contour modifying step, during which the working contour is modified, wherein the global contour cost function evaluation and contour modifying steps are repeated so as to minimize the global contour cost function; and/or m is smaller than or equal to 4.

Another aspect of the invention relates to a method of providing an optical lens to be mounted to a spectacle frame, the method comprising:

a surface determining step during which at least one surface of the optical lens is determined according to a method according to the invention, a manufacturing step during which at least one surface of the optical lens is manufactured.

The method of providing an optical lens may comprise further to the surface determining step a second surface determining step during which the optical surface of the second face of the optical lens is determined, for example using the method disclosed in WO2007/017766.

According to a further aspect, the invention relates to a computer program product comprising one or more stored sequences of instructions that are accessible to a processor and which, when executed by the processor, causes the processor to carry out the steps of the method according to an embodiment of the invention.

Another aspect of the invention relates to a computer readable medium carrying one or more sequences of instructions of the computer program product according to an embodiment of the invention.

Another aspect of the invention relates to a program which makes a computer execute the method according to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings in which:

FIG. 5b represents part of the cross section of FIG. 5a; and

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Furthermore, in the framework of the invention, the following terms have the meaning indicated herein below.

As is known, each point of an aspherical surface has an altitude z. For each point of the surface, a minimum curvature $CURV_{min}$ is by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspherical surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical.

From these expressions of the minimum and maximum curvatures $CURV_{min}$ and $CURV_{max}$, the minimum and maximum spheres labelled $SPH_{min}$ and $SPH_{max}$ can be deduced according to the kind of surface considered.

When the surface considered is the object side surface—also called front surface, the expressions are the following:

$$SPH_{min} = (n-1)*CURV_{min} = \frac{n-1}{R_{max}} \text{ and}$$

$$SPH_{max} = (n-1)*CURV_{max} = \frac{n-1}{R_{min}}$$

where n is the index of the constituent material of the lens.

If the surface considered is an eyeball side surface—also called rear surface, the expressions are the following:

$$SPH_{min} = (1-n)*CURV_{min} = \frac{1-n}{R_{max}} \text{ and}$$

-continued $$SPH_{max} = (1-n)*CURV_{max} = \frac{1-n}{R_{min}}$$

where n is the index of the constituent material of the lens.

As is known, a mean sphere $SPH_{mean}$ at any point on an aspherical surface can also defined by the formula:

$$SPH_{mean} = \frac{1}{2}(SPH_{min} + SPH_{max})$$

A cylinder CYL is also defined by the formula $CYL=SPH_{max}-SPH_{min}$.

The characteristics of any complex face of the lens may be expressed by means of the local mean spheres and cylinders. A surface can be considered as locally aspherical when the cylinder is at least 0.25 diopters.

A base value is defined as the mean sphere value at one point of the surface.

Figure 1:
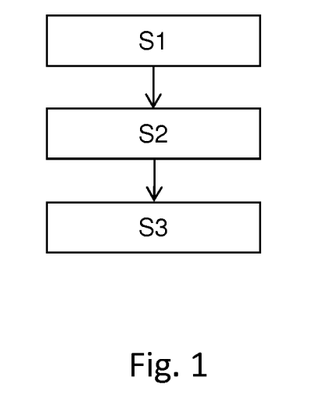
FIG. 1 is flowchart representing the steps of a method according to an embodiment of the invention.

According to an embodiment of the invention illustrated on FIG. 1, the method for determining a surface of a face of an optical lens to be mounted to a spectacle frame comprises:

a contour data providing step S1,
a target curvature data providing step S2, and
an optical surface determining step S3, The method of the invention may be implemented by computer means.

During the contour data providing step S1, contour data representing points of a contour of the spectacle frame is provided. Others data representative of a contour of the spectacle frame may be chosen from, but no limited to, the list comprising: a 3D spline from one of the edge or face of the spectacle frame, a 3D digital representation of the spectacle frame, an average tore sphere or cylinder plus a 2D shape representative of the front face of the spectacle. The contour data of spectacle frame may come directly from the spectacle, or indirectly from a lens having the same shape as the spectacle frame, for example demonstration lens generally provided with the spectacles. Also, the contour data may be just data about the average curvature of the spectacle frame. This average curvature may come from a mechanical sensor measuring device, or from a database, or from a spherometer using the demonstration lens, or any other mean.

Figure 2:
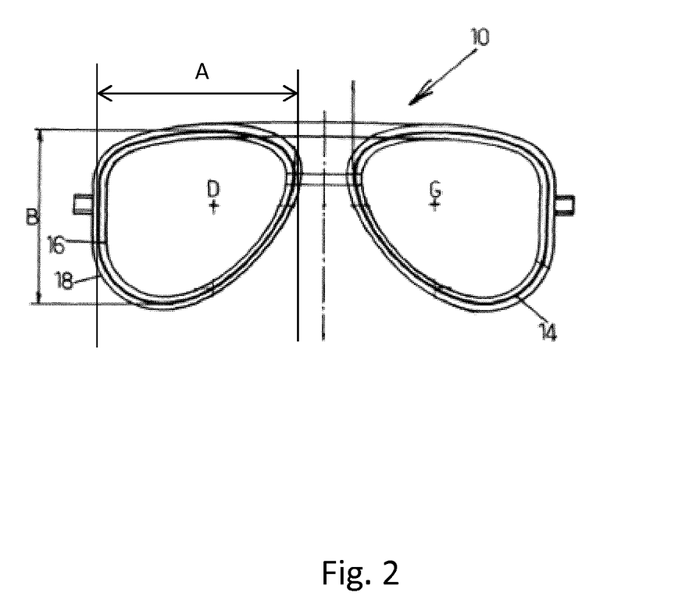
FIG. 2 is the front face of a closed rim spectacle frame.

FIG. 2 shows a representation of a spectacle frame 10 and the position of the right and left pupils of the wearer relative to the spectacle frame 10, which are respectively referenced D and G.

FIG. 2 shows for the frame 10 the contour of the lens in thick lines 14, and in thin lines the internal 16 and external 18 contour of the spectacle frame 10.

The template of the spectacle frame is an element, made of plastic or another material, the contour of which corresponds to the bottom of the groove of the spectacle frame. The template is therefore the external shape that the lens must have once cut out in order to fit in the frame spectacle.

The letter A designates the total width and the letter B designates the total height of the template determined with the Boxing system, i.e. according to the ISO8624 standard on systems for the measurement of lenses frames. This width and height correspond to the width and height of a rectangle into which the lens fits once it is cut out.

The features, in particular the internal contour of a given frame can be measured on the frame, using a device known in the art.

For example, U.S. Pat. No. 5,333,412 describes a device which makes it possible to measure in 3-dimensions, the shape of the bottom of the groove of the frame.

The features of a frame can also be given directly by the manufacturer according to the model chosen by the wearer, this features can also include the demonstration lens.

Unless specifically stated otherwise, the method according to the invention may apply to any type of spectacle frame, for example metal frames, plastic frames, combination frames, semi-rimless frames, Nylor frames, rimless.

Since, according to the method of the invention, at least one surface of the optical lens is determined based on the contour of the spectacle frame, it appears that the definition of such contour is a great importance.

The measuring devices, as referred to previously, provide a set of points that have been measured at different position along a contour, for example the internal groove, of the spectacle frame.

Depending on the complexity of the surface to be determined according to the invention, the contour may better be defined as a continuous curve rather than as a set of points, especially if the number of point in the set is low. An over use of a continuous curve is to avoid the measuring noise from the measurement device.

Figure 3:
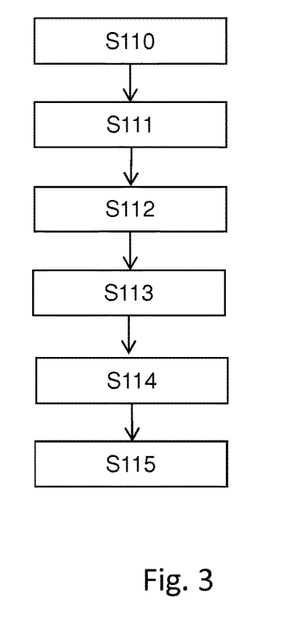
FIG. 3 is a flowchart representing some of the steps of a method according to an embodiment of the invention.

Therefore, as illustrated on FIG. 3, the contour data provided during the contour data providing step may be obtained by a method, for example implemented by computer means, comprising:

a contour data providing step S110,
a working contour defining step S111,
a first contour cost function providing step S112,
a set of contour cost functions providing step S113,
a global contour cost function evaluation step S114, and
a contour modifying step S115, According to an embodiment of the invention the global contour cost function evaluation and contour modifying steps are repeated so as to minimize the global contour cost function.

The measured points of the contour are provided during the contour data providing step S110. Such measured points may be obtained using known measuring devices, for example using a mechanical sensor device.

During the working contour defining step S111, a working contour Cw is defined. For example, the working contour Cw may be obtained by joining each of the points of the contour data or by considering the mean value of the data points.

A first contour cost function Jc1 is provided during the first contour cost function providing step S113. The first contour cost function Jc1 is function of the mth derivative of the curve of at least a portion, for example the entire, of the working contour Cw.

According to an embodiment of the invention, m is an integer greater than or equal to 2 and smaller than or equal to 4.

A set of contour cost functions (Jc2, Jc3, . . . Jck) are provided during the contour cost functions providing step S114, with k an integer greater than or equal to 2, i.e. the set of contour cost functions comprises at least one contour cost function.

Each contour cost functions of the set of contour cost functions is defined on part of the contour and is a function of at least the deviation between the working contour and part of the measured points of the contour. For example, each cost function is defined so as to be minimum when the deviation between the working contour and part of the measured points of the contour is minimum.

A global contour cost function Gc is defined and evaluated during the global cost function evaluation step S115. The global contour cost function is a weighted sum of the first contour cost function Jc1 and of each of the contour cost function of the set of contour cost functions, i.e.

$$Gc = \sum_{i=1}^{k} \beta_i \times J_{ci}$$

with $\beta_i$ the weight of the ith contour cost function and $\sum_{i=1}^{k} \beta_i = 1$.

The working contour is modified during the contour modifying step S116 and the global contour cost function Gc is reevaluated for the modified working contour Gc.

The contour modifying step S116 and the global contour cost function evaluation step S115 are repeated so as to obtain an optimized contour for which the global cost function Gc is minimum.

Advantageously, the obtained optimized contour has a smooth curvature, thanks to the first contour cost function Jc1 and is an accurate representation of the contour, thanks to the further contour cost functions (Jc2, Jc3, . . . , Jck).

Having a plurality of contour cost functions in the set of contour cost functions allows having different weights for different parts of the contour of the spectacle frame. One may want to give a greater weight to certain parts of the contour over others. This may be done by defining different contour cost functions and attributing different weights to each contour cost function.

According to an embodiment of the invention, the method may further comprise a maximum deviation step during which a maximum deviation between the measured points of the contour and the optimized contour is defined and during the global contour cost function evaluation step the weight of the first cost function is adjusted so as to have the deviation between the measured points and the contour smaller than or equal to the maximum deviation.

During the target curvature data providing step S2, target curvature data representing the target curvature of the surface (i.e. the desired curvature of the surface) to be determined over an evaluation zone is provided.

The target curvature data may be a curvature value or represent a shift of curvature, for example based on the average curvature of the contour of the spectacle frame.

The target curvature may also be defined from a set of points defined by their 3D coordinates. In this case the target curvature could be the curvature of the surface passing through the points or the curvature of the closest sphere to the set of points.

The target curvature may also be defined from a base value. In this case the target curvature is related with the mean sphere value as seen previously.

The target curvature may also be defined from a set of different curvatures for different directions. In this case the target curvature is determined from the set of curvatures as the minimum or maximum or average curvature of the set of different curvatures.

According to an embodiment of the invention, the target curvature may be different from the average curvature of the spectacle frame.

In the sense of the invention, the average curvature of the spectacle frame CURVm is to be understood as the curvature of the closest sphere, in the least-squares sense, to the set of points of a contour of the spectacle frame. By extension a base value for the contour of the spectacle frame (Bm) in diopters can be define with:

$$Bm=(n-1)*CURVm$$

The curvature of an optical surface is the curvature in a zone or at a specific point of said surface. If the surface is spherical, the curvature is constant and can be determined everywhere. If the surface is a single vision aspheric surface, its curvature is usually measured or determined at the optical center. If the surface is a progressive addition surface, its curvature is usually measured or determined at the distance-vision point. In the sense of the invention, the average curvature of the surface on an evaluation zone is to be understood as the mean of the principal curvatures of the surface over this evaluation zone.

More particularly, the average curvature of the surface at its center is to be understood as the mean of the principal curvatures of the surface at the boxing center when the optical lens is positioned with respect to the spectacle frame.

When the optical lens is an ophthalmic lens, for example a progressive addition lens, adapted for a wearer, the wearer's prescription is to be considered during the optical surface determining step. For example, the value of the target curvature and the evaluation zone may be set based on the wearer's prescription.

According to an embodiment of the invention, the target base value (Bi) representative of the target curvature (Ci) fulfills:

$$Bm-3 \leq Bi \leq Bm+3,$$

with Bm the base value in diopters of the spectacle frame

The target base value (Bi) representative of the target curvature (Ci) may be chosen in an different range and fulfills this time:

$$Bm-DBinf \leq Bi \leq Bm+DBsup.$$

The values of DBinf and DBsup may depend on optical requirements of the optical lens and/or technical limitations of the manufacturing method to be used to finally manufacture the optical surfaces of the optical lens.

According to an embodiment of the invention, the calculated surface can be the front surface of the optical lens. Calculating the optical lens with a given front face is known from the man skilled in the art and an example of an accurate method is disclosed in patent document WO 2007/017766. In the following a target lens is a virtual lens that has a virtual optical function according to a wearer's prescription and to a chosen optical design.

The optical requirements may be define as an acceptable difference between optical parameters of the optical lens as determined by the method of the invention and a target optical lens.

The optical requirements should be one or more optical parameters chosen in the non limitative list comprising dioptric power, total astigmatism and resulting astigmatism.

The method for calculating the difference of a selected parameter value between a lens from the invention and a target lens is chosen in the non limitative list comprising root mean square (RMS) differences, peak to valley (PV) differences, standard deviation and point to point differences.

A selected parameter is an optical parameter determined at a specific point or in a zone of the lens, as for an example a zone around the optical center or the prism reference point (PRP) or more specially in relation with the aim of the invention the zone of the lens may be selected within the final contour.

According to an embodiment, DBinf and/or DBsup may be determined, for example by optimization, so that the difference of RMS values of the dioptric power is less or equal to 0.6 diopter or even less or equal to 0.4 diopter or even less or equal to 0.2 diopter.

According to an embodiment, DBinf and/or DBsup may be determined, for example by optimization, so that the difference of RMS values of resulting astigmatism is less or equal to 0.75 diopter or even less or equal to 0.5 diopter or even less or equal to 0.25 diopter.

DBinf and DBsup may also be determined by performing different calculations for different values of DBinf and DBsup respectively, starting from, for example, −3D to +3D with a constant step of 0.25D between each different values, and calculating for each DBinf/DBsup values the optical requirement. The maximum DBsup value for which the lens having a target base value Bm+DBsup complies the optical requirement is the final DBsup value, and the maximum DBinf value for which the lens having a target base value Bm-DBinf complies the optical requirement is the final DBinf value. The final range of available target curvature is so between Bm−DBinf and Bm+DBsup.

Without using a target optical lens, one may defined a maximum acceptable optical defect of the determined optical lens.

For example, a value of maximum resulting astigmatism may be defined over a zone of the determined optical lens, such as a circle centered on the prism reference points of the lens and of a diameter of 40 mm.

Such maximum resulting astigmatism may also be determined for a given gazing direction.

According to an embodiment of the invention, DBinf and/or DBsup may be set base on desired technical effects. The value of the difference of curvature may be chosen so as to guarantee the technical realization of the lens.

DBinf and/or DBsup are to be set from a predetermined value. In other words the difference of curvature between the surface to be determined and the curvature of the spectacle frame is limited by a predetermined value.

Indeed, the current machining technology limits the production of an optical lens wherein one of the two faces would have radii of curvatures locally too small.

Such limitation may advantageously be considered when implementing the method according to the invention by set the maximum value of DBinf and/or DBsup.

The maximum value of DBinf and/or DBsup is set to 1.0 diopter, preferably to 2.0 diopter and more preferably 3.0 diopter.

Once the range of a target base value has been determined, using at least one the above requirement, this range of target base value may be propose to the wearer so as he/she can for example select the smaller target base value if he/she wants to have a flat appearance for the spectacle, or the biggest target base value available if he/she wants to have a curve appearance for the spectacle. The target base value may also be selected automatically among the available range of target base values, for example selecting systematically the minimum or maximum target base value available.

Figure 4:
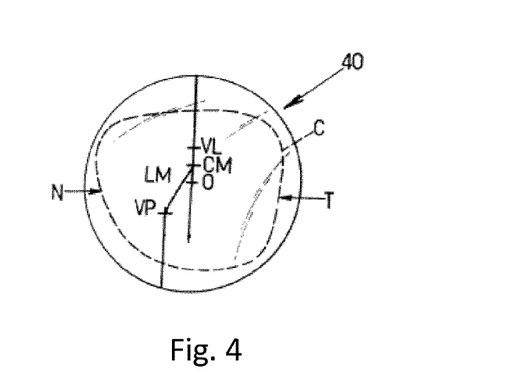
FIG. 4 represents the contour of a progressive additional lens, before and after edging.

FIG. 4 shows schematically a progressive addition lens, before the latter has been edged around a contour C to the dimensions of a spectacle frame. In the figure, the nasal and temporal sides of the lens, respectively denoted N and T, the meridian line LM, the far-vision and near-vision points, respectively denoted VL and VP, the inset In, and an prism reference point (PRP) of the lens, denoted O, are indicated.

Figure 5A:
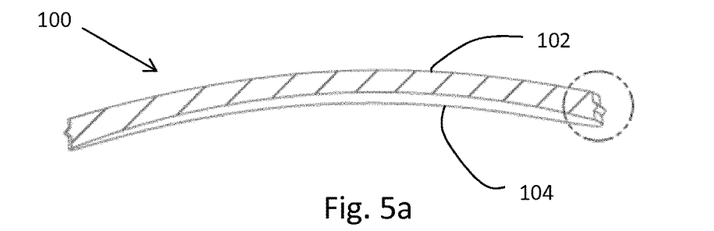
FIG. 5a represents a cross section of an ophthalmic lens edged to fit a closed frame rim.
Figure 5B:
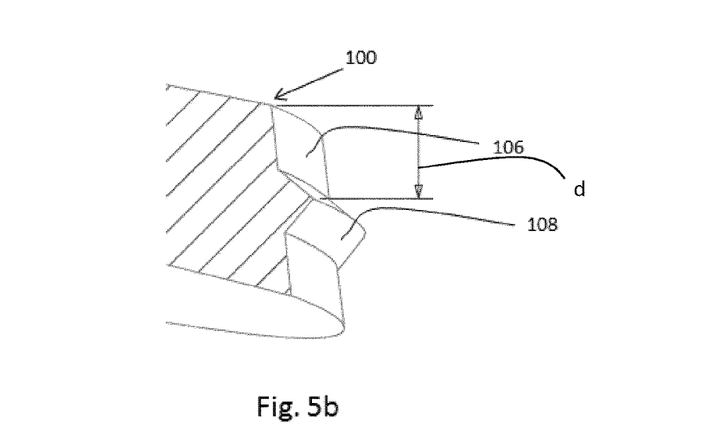

FIGS. 5a and 5b show a cross section of an edged and beveled ophthalmic lens 100. Such ophthalmic lens presents a front face 102, a rear face 104 and an external periphery 106.

The rear face 104 is the face the closest to the eye of the wearer when the ophthalmic lens is fitted on the frame.

The external periphery 106 is processed during the edging and beveling steps. The external periphery presents fitting means, in this case a bevel 108. As discussed previously, the geometry of the bevel, in particular its position and shape, depends on the spectacle frame in which the ophthalmic lens is to be fitted.

Advantageously having over the periphery of the ophthalmic lens a constant distance d between the bevel 108 and the front face 102 of the ophthalmic lens facilitates the beveling step and the mounting of the edged ophthalmic lens in the spectacle frame. Furthermore, having the distance d constant increases the esthetic result of the mounted ophthalmic lens.

Optionally, the external periphery of the lens can present a front face counter bevel and a rear face counter bevel.

Although the rear face 104 is represented on FIGS. 5a and 5b as concave, it will be appreciated that this rear face could equally well be convex or any other curved surface.

According to different embodiments of the invention, the evaluation zone may be selected in the list consisting of: near vision zone, far vision zone, the intermediate corridor between the near and far vision zone, a peripheral rim, a nasal zone, and a temporal zone, and a zone centered on the boxing center.

Preferably the surface to be determined according to the invention is the front surface of the optical lens.

During the optical surface determining step S3, the surface to be determined is determined so as to minimize:
the difference between the target curvature and the average curvature of the surface over the evaluation zone, and
the difference between the contour of the spectacle frame and the periphery contour of the surface, the periphery contour of the surface corresponding to the contour of the surface of the optical lens after the optical lens has been edged to be mounted in the spectacle frame.

As indicated previously, the optical surface may be determined based on the difference of curvature of the contour of the spectacle frame and the periphery contour of the surface.

According to an embodiment of the invention, the optical surface is determined so as to minimize the deviation between the periphery contour of the surface to be determined and the contour of the spectacle frame. In other words, the optical surface is determined so as to minimize the average difference in altitude between the periphery contour of the determined surface and the spectacle frame.

For example, the deviation between the surface to be determined and the contour of the spectacle frame defined by the contour data may be set to be smaller than or equal to 0.4 mm.

Such deviation may be smaller depending on the type of spectacle frame. In particular for metal frame, the maximum deviation may be set to 0.2 mm.

The optical surface determining step may be implemented using different determination methods.

For example, based on the wearer's prescription and the average curvature of the spectacle frame, the curvature of the surface around the optical center or any optical reference point of the optical lens may be selected trough a data base.

According to an embodiment, the optical surface determining step comprises a semi-finished optical lens selecting step. During the semi-finished optical lens selecting step, a semi-finished optical lens is selected among a list of semi-finished optical lenses having a different average curvature at their periphery and over an evaluation zone. The semi-finished optical lens selected may be the semi-finished having both the closest average curvature around its periphery to the average curvature of the contour of the spectacle frame and the closest curvature in the evaluation zone to the target curvature.

The skilled person may also adapt the method disclosed in US 2012/0057123 to determine the surface during the determining step.

Figure 6:
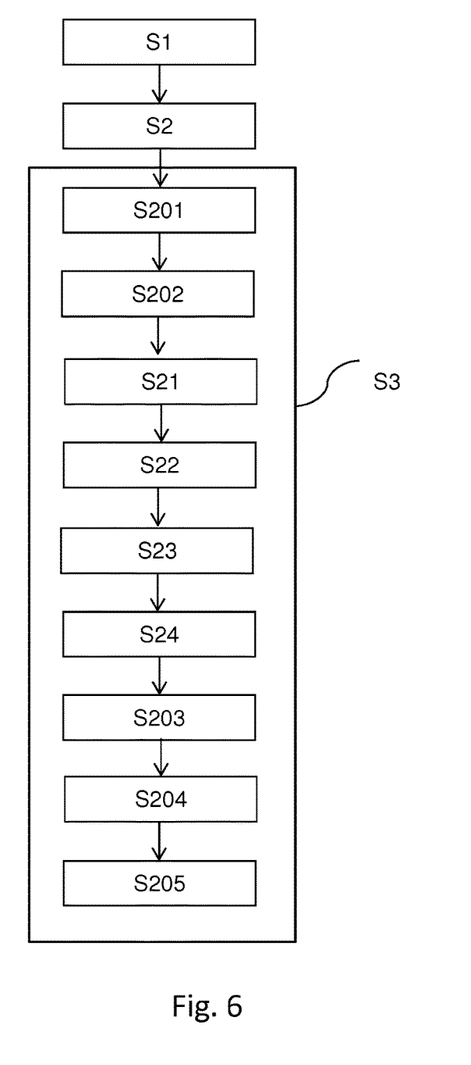
FIG. 6 is a flowchart representing the steps of a method according to an embodiment of the invention.

According to an embodiment of the invention, the method of the invention may further comprise prior to the optical surface determining step
a first surface cost function providing step S21, and
a second cost function providing step S22.

During the optical surface determining step S3, the surface that minimizes a global surface cost function is determined, the global surface cost function being a weighted sum of at least the first and second surface cost functions provided during the first surface cost function providing step and the second cost function providing step S22.

The first surface cost function J1 provided during the first surface cost function providing step S21 is a function of the deviation between the surface to be determined and the contour of the spectacle frame as defined in the contour data.

The second cost function J2 provided during the second cost function providing step S22, is a function of the difference over the evaluation zone between the curvature of the surface to be determined and the target curvature.

In order to increase the smoothest of the determined optical surface, the method according to the invention may further comprise a third surface cost function providing step S23.

During the third surface cost function providing step S23, a third surface cost function is provided, the third surface cost function being a function of the ith derivative of the surface to be determined with i an integer greater than or equal to 2, and preferably smaller than or equal to 4.

According to a preferred embodiment of the invention, the third surface cost function is directly proportional to the ith derivative of a working surface WS, defined herewith below. In other words, the third cost function J3 is minimum when the ith derivative of the working surface WS is minimum.

The global surface cost function is then a weighted sum of at least the first, second and third surface cost functions.

According to an embodiment of the invention, the method may be an optimization method further comprising:
an initial optical surface providing step S201,
a working optical surface defining step S202,
a global surface cost function evaluation step S204, and
a modifying step S205.

The evaluation and modifying steps are repeated so as to minimize the global surface cost function as evaluated in the global surface cost function evaluation step S204.

During the initial optical surface providing step S201, an initial optical surface IS to be optimized is provided.

A working surface WS is defined during the working optical surface defining step S202. The working optical surface WS is initially defined as equal to the initial optical surface IS.

According to an embodiment of the invention, the method may further comprise a set of surface cost functions providing step S203. A set of surface cost functions J4, J5, . . . , Jp is provided during the set of surface cost functions providing step S203, p being an integer greater than or equal to 4, i.e. the set of surface cost functions comprises at least one cost function.

Each surface cost function of the set of surface cost functions is a function of at least one criterion over an evaluation zone of the working optical surface.

According to an embodiment of the invention, at least one evaluation zone is defined on the initial surface and a cost function is associated to the evaluation zone. The cost function is a function of the value of at least one criterion of the evaluation zone.

The evaluation zone may be of any type and have any shape. For example the evaluation zone may be a peripheral rim, in particular the rim of a selected spectacle frame intended to be used with the ophthalmic lens.

The evaluation zone may further be a nasal zone or a temporal zone of the optical lens.

When the optical surface to be optimized is an optical surface of a progressive addition lens, the evaluation zones may be the near vision zone, and/or the far vision zone, and/or an intermediate corridor between the near and far vision zones. The far vision zone corresponds to a zone around the far vision point and the near vision zone corresponds to a zone around the near vision point.

Progressive lenses comprise micro-markings that have been made mandatory by a harmonized standard ISO 8990-2. Temporary markings may also be applied on the surface of the lens, indicating diopter measurement positions (sometimes referred to as control points) on the lens, such as for far vision and for near vision, a prism reference point and a fitting cross for instance, as represented on FIG. 2. It should be understood that what is referred to herein by the terms far vision point and near vision point can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The criteria of each of the cost function Ji of the set of cost functions may be a surface criterion at a given point of the evaluation zone or over part, for example all, of the evaluation zone.

For example, the surface criterion may be selected among the list consisting of: the sphere in at least one point of the evaluation zone, the mean sphere over the evaluation zone, the cylinder in at least one point of the evaluation zone, the mean cylinder over the evaluation zone, the altitude of at least one point of the evaluation zone, the mean altitude over the evaluation zone, the gradient of sphere in at least one point of the evaluation zone, gradient of cylinder in at least one point of the evaluation zone, the second order derivation of the sphere in at least one point of the evaluation zone, the second order derivation of the cylinder in at least one point of the evaluation zone.

A global cost function is defined and evaluated during the global cost function evaluation step S204.

The global cost function G is a weighted sum of the first surface cost function and the each surface cost function of the set of cost functions, i.e.

$$G = \sum_{i=1}^{P} \alpha_i \times J_i$$

with $\alpha_i$ the weight of the ith cost function and $\sum_{i=1}^{P} \alpha_i = 1$.

During the modifying step S205, the working surface WS is modified and the global cost function is revaluated for the modified working surface.

The evaluation and modifying steps are repeated so as to minimize the global cost function. The working surface WS having the smallest global cost function can be considered as the best compromised between the criterion over the evaluation zone and the overall smoothness of the optical surface.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining a surface of a face of an optical lens to be mounted to a spectacle frame, the method comprising:
providing contour data representing a contour of the spectacle frame,
providing target curvature data representing the target curvature of the surface to be determined over an evaluation zone of the surface,
providing a first surface cost function, the first surface cost function being a function of the deviation between the surface to be determined and the contour of the spectacle frame defined by the contour data,
providing a second surface cost function, the second surface cost function being a function of the difference over the evaluation zone between the curvature of the surface to be determined and the target curvature, and
determining an optical surface so as to minimize:
the difference between the target curvature and average curvature of the surface over the evaluation zone,
the difference between the contour of the spectacle frame and the periphery contour of the surface, the periphery contour of the surface corresponding to the contour of the surface to be determined of the optical lens after the optical lens has been edged to be mounted in the spectacle frame, and
a global surface cost function, the global surface cost function being a weighted sum of at least the first and second surface cost functions.

2. The method according to claim 1, wherein the contour data comprises at least the mean curvature of the contour and/or the 3D coordinates of points of the contour.

3. The method according to claim 1, wherein the target curvature data comprises at least a curvature value and/or a shift of curvature and/or a base value and/or a set of points defined by their 3D coordinates; and/or a set of different curvatures for different directions.

4. The method according to claim 3, wherein the target base value Bi representative of the target curvature Ci in diopters fulfills:

$$Bm-3 \leq Bi \leq Bm+3,$$

with Bm the average base value in diopters of the spectacle frame, and $$Bm=(n-1)*CURVm$$

with CURVm the average curvature of the spectacle frame, and n the index of the constituent material of the lens.

5. The method according to claim 3, wherein the target base value Bi representative of the target curvature Ci in diopters fulfills:

$$Bm-\Delta Binf \le Bi \le Bm+\Delta Bsup,$$

with ΔBinf and ΔBsup depending on optical and/or technical requirements of the optical lens to be determined, and $$Bm=(n-1)*CURVm$$

with CURVm the average curvature of the spectacle frame, and n the index of the constituent material of the lens.

6. The method according to the claim 1, wherein the target curvature is different from the average curvature of the spectacle frame.

7. The method according to claim 1, wherein the evaluation zone is selected from a list consisting of: near vision zone, far vision zone, the intermediate corridor between the near and far vision zone, a peripheral rim, a nasal zone, a temporal zone, and a zone centered on the boxing center.

8. The method according to claim 1, wherein, during the determining of the optical surface, the optical surface is determined based on the difference of curvature of the contour of the spectacle frame and the periphery contour of the optical surface.

9. The method according to claim 1, wherein during, the determining of the optical surface, the optical surface is determined so as to minimize the deviation between the periphery contour of the surface to be determined and the contour of the spectacle frame.

10. The method according to claim 1, wherein the deviation between the surface to be determined and the contour of the spectacle frame defined by the contour data is less or equal to 0.4 mm.

11. The method according to claim 10, wherein the deviation between the surface to be determined and the contour of the spectacle frame defined by the contour data is less or equal to 0.2 mm.

12. The method according to claim 1, wherein the determining of the optical surface comprises selecting a set of semi-finished optical lenses having the closest average curvature around their periphery to the average curvature of the contour of the spectacle frame and having a different average curvature at their periphery and over an evaluation zone, and among this set of semi-finished optical lenses, selecting the semi-finished lens having the closest average curvature in the evaluation zone to the target curvature in the evaluation zone.

13. The method according claim 1, wherein the method further comprises providing a third surface cost function, the third surface cost function being a function of the ith derivative of the surface to be determined with i an integer greater than or equal to 2 and smaller than or equal to 4, and the global surface cost function is a weighted sum of at least the first, second and third surface cost functions.

14. The method according to claim 1, wherein the method further comprises:
providing an initial surface,
defining a working surface to be equal to at least a portion of the initial surface,
providing a set of surface cost functions, each surface cost function of the set of surface cost functions being a function of at least one criterion over an evaluation zone of the surface to be determined and the set of surface cost functions comprising at least one cost function,
evaluating a global surface cost function, the global cost function being a weighted sum of at least each of the cost functions,
modifying the working surface, and
wherein the surface is determined by repeating the evaluating and modifying so as to minimize the global surface cost function.

15. A method of providing an optical lens to be mounted to a spectacle frame, the method comprising:
determining at least one surface of the optical lens according to a method according to claim 1, and
manufacturing at least one surface of the optical lens.

16. A method for determining a surface of a face of an optical lens to be mounted to a spectacle frame, the method comprising:
providing contour data representing a contour of the spectacle frame,
providing target curvature data representing the target curvature of the surface to be determined over an evaluation zone of the surface, and
determining an optical surface so as to minimize:
the difference between the target curvature and average curvature of the surface over the evaluation zone, and
the difference between the contour of the spectacle frame and the periphery contour of the surface, the periphery contour of the surface corresponding to the contour of the surface to be determined of the optical lens after the optical lens has been edged to be mounted in the spectacle frame,
wherein the deviation between the surface to be determined and the contour of the spectacle frame defined by the contour data is less or equal to 0.2 mm.

17. A method for determining a surface of a face of an optical lens to be mounted to a spectacle frame, the method comprising:
providing contour data representing a contour of the spectacle frame,
providing target curvature data representing the target curvature of the surface to be determined over an evaluation zone of the surface, and
determining an optical surface so as to minimize:
the difference between the target curvature and average curvature of the surface over the evaluation zone, and
the difference between the contour of the spectacle frame and the periphery contour of the surface, the periphery contour of the surface corresponding to the contour of the surface to be determined of the optical lens after the optical lens has been edged to be mounted in the spectacle frame,
wherein the target curvature data comprises at least a curvature value and/or a shift of curvature and/or a base value and/or a set of points defined by their 3D coordinates; and/or a set of different curvatures for different directions, and wherein the target base value Bi representative of the target curvature Ci in diopters fulfills:

$Bm-3 \leq Bi \leq Bm+3$, with Bm the average base value in diopters of the spectacle frame, and $Bm=(n-1)*CURVm$ with CURVm the average curvature of the spectacle frame, and n the index of the constituent material of the lens.

* * * * *